United States Patent [19]
Capra et al.

[11] 4,158,927
[45] Jun. 26, 1979

[54] FISHING MATERIAL

[75] Inventors: Theodore L. Capra; Nancy J. Capra, both of New Brighton, Minn.

[73] Assignee: Cordell Tackle, Inc., Hot Springs, Ark.

[21] Appl. No.: 788,327

[22] Filed: Apr. 18, 1977

[51] Int. Cl.² .............................................. A01K 85/00
[52] U.S. Cl. ......................................... 43/4.5; 43/42; 43/42.19; 43/42.24; 43/42.28; 43/42.5; 43/42.53; D22/27
[58] Field of Search ...................... 43/1, 4, 4.5, 7, 15, 43/42, 42.06, 42.24, 42.28, 43.1, 42.7, 42.53, 42.19, 42.5; 24/204; D22/27, 28, 29

[56] References Cited

U.S. PATENT DOCUMENTS

| | | | |
|---|---|---|---|
| 2,648,928 | 8/1953 | Sam | 43/43.1 X |
| 3,009,235 | 11/1961 | De Mestral | 128/DIG. 15 |
| 3,368,811 | 2/1968 | Finney | 273/72 |
| 3,469,289 | 9/1969 | Whitacre | 24/205.17 |
| 3,643,316 | 2/1972 | Girard et al. | 24/204 |
| 3,721,447 | 3/1973 | Louderback | 273/186 E |
| 3,757,452 | 9/1973 | Parker | 43/42.25 |
| 3,788,641 | 1/1974 | Lemelson | 273/1 M |
| 3,803,743 | 4/1974 | Nalepka | 43/4 |
| 3,815,276 | 6/1974 | Harrison | 43/43.1 |
| 3,940,873 | 3/1976 | Lawless | 43/57.5 R |
| 4,012,862 | 3/1977 | Dubois | 43/42.06 |

OTHER PUBLICATIONS

Midwest Outdoors, p. 17, Aug. 1977, "Velcro, Scotchmate! Super Fish Catchers".
Popular Mechanics, vol. 130, No. 2, 8-1968, p. 90.

*Primary Examiner*—Clifford D. Crowder
*Attorney, Agent, or Firm*—Berman, Aisenberg & Platt

[57] ABSTRACT

Apparatus which may be utilized either alone or in conjunction with a standard fish hook and lure as a means for catching fish. The apparatus comprises a piece of fabric, which may be cut to any desired shape, which has a plurality of upstanding loop elements or curled strands formed thereon. The loop elements are engageable by the teeth of a fish, and may be utilized either alone to catch the fish, or in combination with a standard lure and hook as a delay means or holding agent until the hook may be set by the fisherman.

45 Claims, 46 Drawing Figures

FISHING MATERIAL

BACKGROUND OF THE INVENTION

1. Field of the Invention

The present invention is related to fishing apparatus and, more particularly, is directed to a novel and unique means for catching fish which may be used either alone or in combination with standard lures and fish hooks.

2. Description of the Prior Art

Most, if not all, of the devices presently utilized to catch fish employ one or more metal, barbed fish hooks for this purpose. Such hooks, in order to perform their function, must normally be drawn into the mouth of the fish and either swallowed or, depending upon the sensitivity of the fisherman to the strike, may be set into the mouth cavity of the fish by a quick tug or jerk on the line. A disadvantage of the latter technique is that, clearly, a fisherman must be very sensitive to the initial contact by the fish lest the strike go unnoticed. It would clearly be advantageous if some means were provided which could somehow decrease the required sensitivity of the fisherman by holding the fish in position until the hook could be properly set without requiring undue speed, alertness or skill.

It would also be advantageous if a means for catching fish could be developed which did not require a conventional metal fish hook. The reasons for wanting to dispense with the requirement for a hook are numerous. Hooks are expensive and must be manufactured in a plurality of different sizes in order to enable the many different sizes of fish to be caught. The hook must be strong enough to function without being destroyed by the teeth of the fish. Barbed metal hooks can also damage the fish and cause the fish to resist being pulled in, sometimes to the extent that not only is the fish lost, but it is caused to suffer serious injury or death.

Modern day fishing lures use hooks in combination with a variety of artificial lures, some of which include strands or skirts of material which may become entangled in the hook to reduce the latter's fish catching ability. Such entanglement also reduces the ability of the lure to perform its fish attracting function.

Some of the foregoing reasons pertaining to disadvantages of using conventional fish hooks have been recognized by others in the field. For example, U.S. Pat. No. 3,757,452 discloses a hookless lure which comprises a tassle-like arrangement of a bundle of thousands of elongated fibers, each of the fibers having a minute diameter on the order of 0.004 inches, which may be comprised, for example, of nylon, and which are intended to catch billfish by contacting and thereby adhering to the rough black scaly surface of the bill of the fish. While such a device may be useful, the teachings of the patent are clearly limited to catching billfish or fish which have rough exterior surfaces to which such tassles may become adhered.

OBJECTS AND SUMMARY OF THE INVENTION

It is therefore a primary object of the present invention to provide a novel and unique means for catching fish which does not require utilization of a standard hook in order to snare and bring in the fish.

Another object of the present invention is to provide a novel apparatus for catching fish which may be utilized in combination with a standard fish hook to serve as a holding agent when the fish strikes to give the fisherman additional time to set the hook properly.

An additional object of the present invention is to provide a novel means for catching fish which may be utilized either alone or in conjunction with standard, artificial fishing lures and/or fish hooks in a multiplicity of different configurations.

A still further object of the present invention is to provide a novel hookless means for catching fish.

The foregoing and other objects are attained in accordance with one aspect of the present invention through the provision of apparatus which comprises means for catching fish which comprises loop elements and means for supporting loop elements. The supporting means and loop elements comprise a material which may more particularly be described as comprised of astrakhan pile, presently marketed as the female, loop element portion of the fabric sold under the trademark Velcro. The teeth of the fish serve as the loop-engaging hook elements to snag, delay, and/or catch the fish.

The means for catching the fish may, more particularly, comprise artificial lure means to which the loop element material is attached. The artificial lure may take any of a number of conventional forms, such as an elongated, flexible plastic worm-like body, a jig, plug, or spinner bait. The pieces of fabric containing the loop elements or loop pile sheets may be configured in any of a number of forms and attached to the artificial lure at the forward, middle or rear portions, on the top, bottom, side or edge surfaces, and may either be elongated, flat, or curved to conform to the body of the lure. Still alternatively, the loop pile fabric sheet may be used alone as a fly-strip, pork rind strip, prepared bait strip, or the like. The loop pile sheets or pieces of fabric containing the loop elements may be applied to spinners, spoons, or lead sinkers, to be utilized either alone or in combination with other fish-attracting means and/or fish hooks.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

The concept of the present invention centers around the utilization, as a means for catching fish, or supporting means, such as a fabric or materials, having loop pile formed thereon. The elements of the loop pile may comprise a multiplicity of upstanding loops or curled strands or both. Such loop pile surfaces are sometimes characterized as astrakhan pile, as described in U.S. Pat. No. 3,469,289. More commonly, such loop elements form one-half of a separable pile fastening device, the other half comprising a multiplicity of closely spaced hooking elements. The common hook and loop fasteners are described fully in U.S. Pat. Nos. 2,009,235; and 3,154,837, and have been manufactured by the American Velcro Corporation under the trademark "Velcro" and 3M Co. under the trademark "Scotchmate".

The present invention makes use of the loop elements in the loop pile to catch or assist in the catching of fish. It has been discovered that the teeth of the fish engage in and become entangled by the multiplicity of loop elements to enable the fish to be reeled in without damage, or alternatively to provide sufficient restraining action and delay time to permit the standard hook, with which the loop pile may be utilized, to be set.

Figure 1:
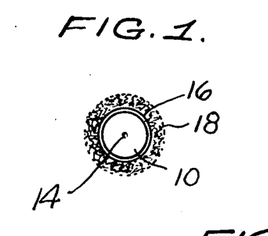
FIG. 1 is an end view of a preferred embodiment of one type of artificial fishing lure in combination with the fishing material of the present invention.
Figure 2:
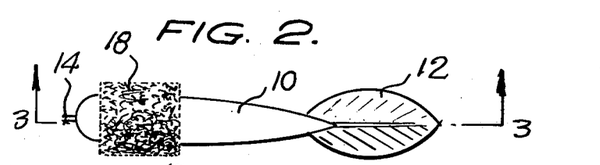
FIG. 2 is a side view of the embodiment illustrated in FIG. 1.
Figure 3:
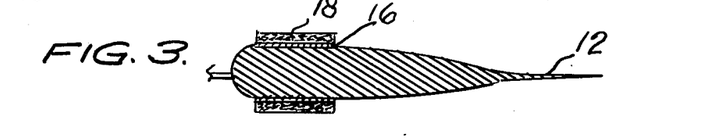
FIG. 3 is a sectional view of the preferred embodiment illustrated in FIG. 2 and taken along line 3—3 thereof.

Referring now to the drawings, wherein like reference numerals designate identical or corresponding parts throughout the several views, and more particularly to FIGS. 1 through 3 thereof, a preferred embodiment of the present invention is illustrated and comprises an artificial fishing lure having a body 10 which is preferably formed of a soft, pliable plastic and has a tail 12 integrally extending from the rear thereof. The body 10 of the lure has a cylindrical or tubular fabric member 16 formed thereabout. The fabric member 16 has a multiplicity of loop elements 18 formed on the outer surface thereof. The fabric member 16 having the loop elements 18 may be fastened to the body 10 by any suitable means or adhesive.

Figure 4:
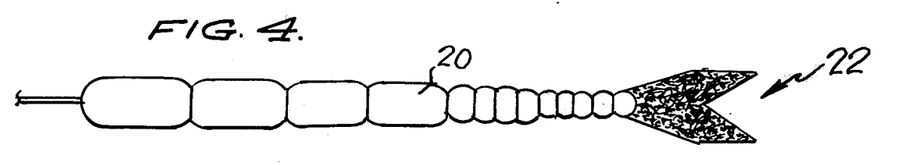
FIG. 4 is a top, plan view illustrating another preferred embodiment of the present invention in combination with an artificial lure.
Figures 5, 6:
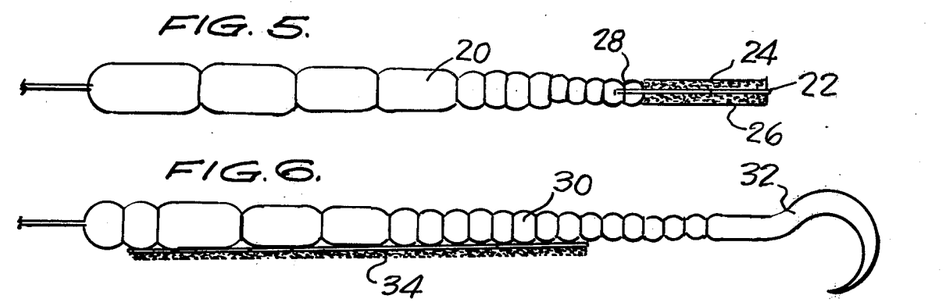
FIG. 5 is a side view of the preferred embodiment illustrated in FIG. 4.
FIG. 6 is a side view of yet another alternative embodiment of the present invention in combination with an artificial fishing lure.

Referring now to FIGS. 4 and 5, reference numeral 20 indicates an elongated flexible plastic worm-like artificial lure body to the rear end of which is connected a V-shaped fabric piece 22 which may have a plurality of loop elements 24 and 26 projecting from both sides thereof. Alternatively, fabric piece 22 may be comprised of two pieces of loop pile sheets bonded together. The forward end 28 of the fabric piece 22 may, for example, be embedded in the tail of the flexible plastic body 20 when the latter is being formed. Alternatively, the fabric piece 22 may be threaded to the end of body 20 by means of a nylon line, or the like. Alternative modes of attachment will suggest themselves to persons of ordinary skill in this art.

Figure 7:
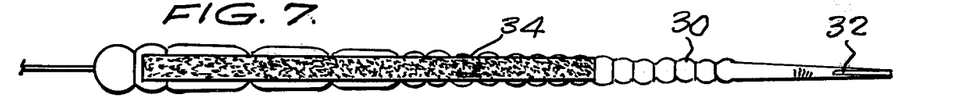
FIG. 7 is a top view of the preferred embodiment illustrated in FIG. 6.

FIGS. 6 and 7 illustrate yet another embodiment of the present invention which comprises an elongated flexible plastic body 30 (similar to the body 20 of FIGS. 4 and 5), but which terminates in a thin, curled plastic tail member 32. FIGS. 6 and 7 also illustrate an alternative mode of attachment of a thin, long strip 34 of fabric having looped elements extending therefrom. In FIGS. 6 and 7, the looped fabric 34 is fastened to the forward side of body 30, although other constructions will suggest themselves and may be equally effective.

Figure 8:
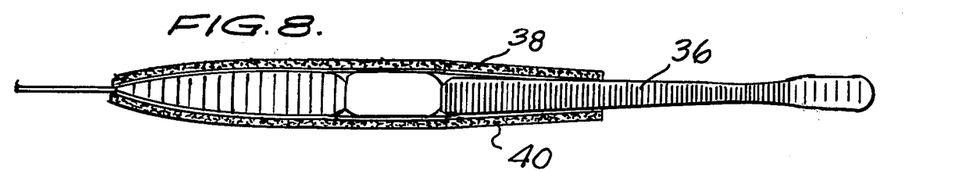
FIG. 8 is a top, plan view of yet another alternative embodiment of the present invention in combination with an artificial fishing lure.
Figure 9:
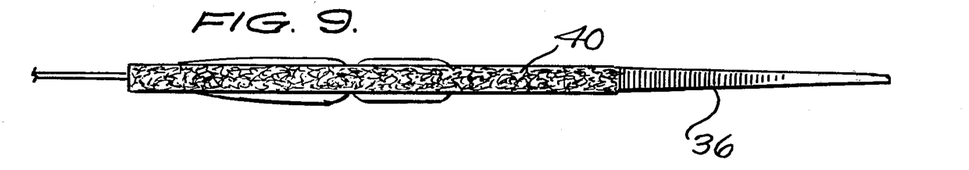
FIG. 9 is a top view of the preferred embodiment illustrated in FIG. 8.

FIGS. 8 and 9 illustrate an alternative embodiment of the present invention wherein reference numeral 36 designates an elongated, flexible, pliable plastic body which has a pair of strips 38 and 40 of the loop pile fabric formed along opposed edges thereof.

Figure 10:
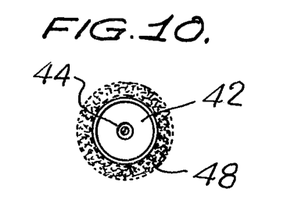
FIG. 10 is an end view of a slip sinker in combination with a preferred embodiment of the present invention.
Figure 11:
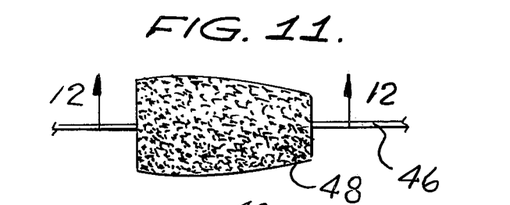
FIG. 11 is a side view of the preferred embodiment of the present invention illustrated in FIG. 10.
Figure 12:
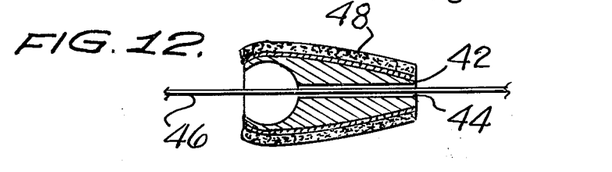
FIG. 12 is a sectional view of the embodiment illustrated in FIG. 11 and taken along line 12—12 thereof.

FIGS. 10 through 12 illustrate an alternative embodiment of the present invention in the form of a slip sinker 42 which has an aperture 44 formed along its longitudinal axis through which the line 46 may be extended. The sinker 42 has a loop pile fabric 48 wrapped about the entire periphery thereof.

Figure 13:
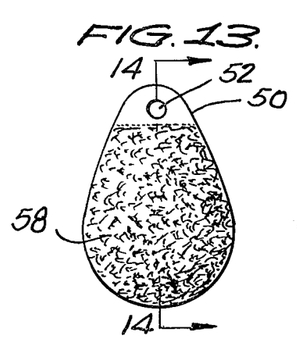
FIG. 13 is a plan view of a spinner embodying another form of the present invention.
Figures 14, 15:
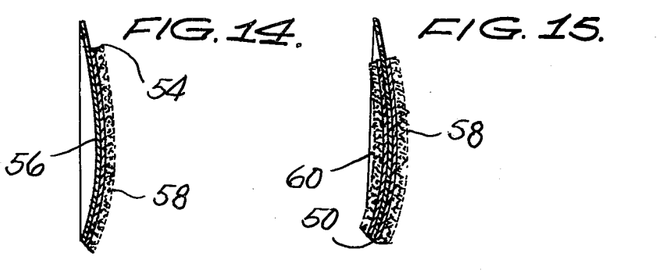
FIG. 14 is a sectional view of the preferred embodiment illustated in FIG. 13 and taken along line 14—14 thereof.
FIG. 15 is a sectional view similar to FIG. 14 but illustrating an alternative form of the present invention.

Referring now to FIGS. 13 and 14, a conventional metallic spinner 50 having an aperture 52 for attachment to a suitable wire frame or the like normally includes a convex surface 54 and a concave surface 56. The present invention contemplates the provision of a suitably shaped piece of loop pile fabric 58 on one or both of the surfaces 54 and 56. For example, the spinner 50 may have an outer piece of fabric 58 attached to convex surface 54, or as illustrated in FIG. 15 may include an inner piece of looped fabric 60 attached to the concave surface 56.

Figure 16:
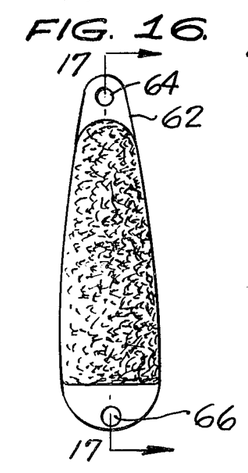
FIG. 16 is a plan view of a spoon which illustrates yet another embodiment of the present invention.
Figure 17:
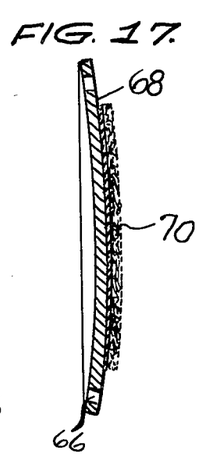
FIG. 17 is a sectional view of FIG. 16 and taken along line 17—17 thereof.

FIGS. 16 and 17 illustrate a curved spoon 62 having a pair of apertures 64 and 66 formed at the upper and lower extremities thereof. This embodiment includes a fabric sheet 70 having loop elements bonded to the outer convex surface 68 thereof.

Figure 18:
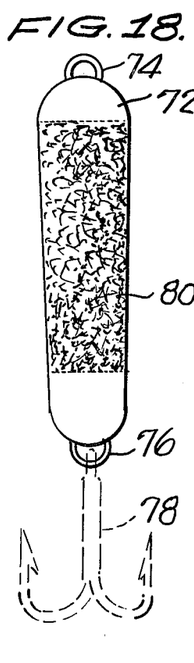
FIG. 18 is a plan view of yet another alternative form of the present invention.
Figure 19:
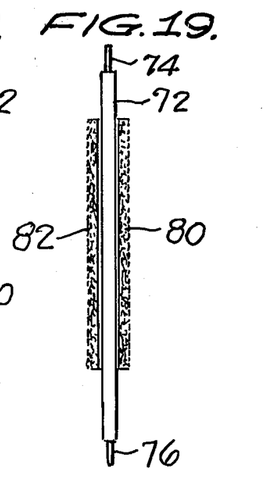
FIG. 19 is a side view of the preferred embodiment of the invention illustrated in FIG. 18.

FIGS. 18 and 19 illustrate a flat spoon 72 having a pair of eyelets 74 and 76 to one of which may be connected a conventional metal fish hook 78. The spoon 72 has at least one strip 80 of looped fabric mounted to one surface thereof, and may include a second strip 82 of looped fabric mounted to the opposite surface thereof. FIGS. 18 and 19 illustrate the utilization of the looped fabric in combination with a conventional fish hook. In this embodiment, as well as in the other embodiments described herein, the loop pile fabric pieces 80 and 82 may serve as a holding agent for the fish until the hook 78 may be properly set by the fisherman after the strike has been sensed.

FIGS. 20 through 27 illustrate jig-type artificial fishing lures having a Velcro loop-type piece of fabric utilized in combination with conventional fish hooks for the purposes described above. More particularly, in FIGS. 20 and 21, reference numeral 84 refers to a jig head having a forward aperture 86 for attachment to the fish line. A standard fish hook 88 extends rearwardly of the jig head 84 and terminates in a standard barbed end 90. Attached at the neck of the jig head 84 are a plurality of strands of either synthetic or natural hairs 92 which serve their standard fish-attracting function. In this embodiment, a pair of loop-type Velcro strips 94 and 96 extend in a parallel fashion on either side of the shank portion of fish hook 88. Strips 94 and 96 may be fastened to the jig head 84 by means of a wrapped binding 98 or the like.

Figures 20, 21, 22, 23, 24, 25:
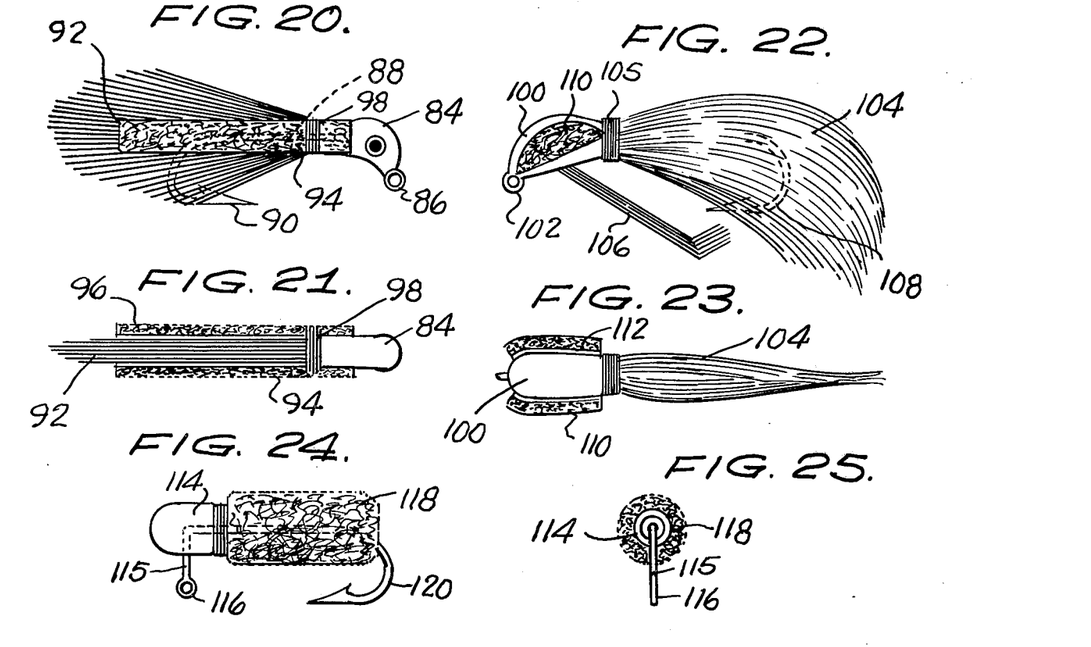
FIG. 20 is a plan view of yet another alternative embodiment of the present invention in combination with a jig lure.
FIG. 21 is a top view of the preferred embodiment illustrated in FIG. 20.
FIG. 22 illustrates a plan view of yet another alternative embodiment of a jig lure embodying the present invention.
FIG. 23 is a top view of the preferred embodiment illustrated in FIG. 22.
FIG. 24 is a plan view of an alternative embodiment of the present invention.
FIG. 25 is an end view of the embodiment illustrated in FIG. 24.

FIGS. 22 and 23 illustrate an alternative type of mounting for a pair of loop pile Velcro strips 110 and 112, one on each side of the jig head 100. This embodiment also includes a forward aperture 102, a skirt 104 held in place by binding 105, a standard fish hook 108, and a set of hook guard wires 106 which extend downwardly from jig head 100.

FIGS. 24 and 25 illustrate a solid jig body 114 having a shank 115 extending downwardly from the head portion thereof and terminating in a loop or aperture 116 for connection to the fishing line. The hook 120 extends rearwardly from body 114, and the entire rear portion of the body may be covered by the loop pile fabric having a plurality of loop elements 118 formed thereon.

Figure 26:
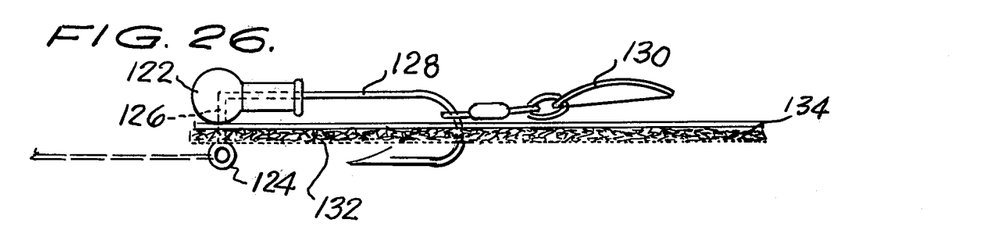
FIG. 26 is a side view which illustrates still another alternative embodiment of the present invention.
Figure 27:
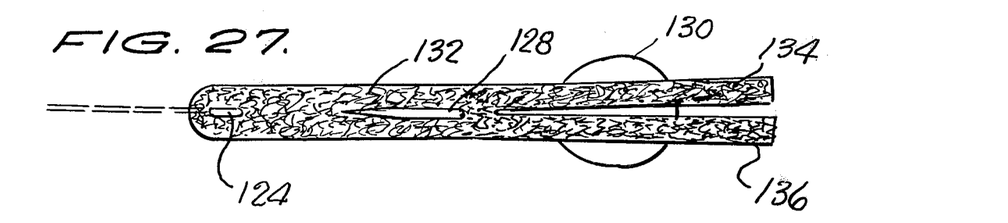
FIG. 27 is a bottom view of the embodiment illustrated in FIG. 26.

FIGS. 26 and 27 illustrate a jig head 122 having a shank portion 126 terminating in a loop 124 for attachment to the fishing line. A hook 128 extends rearwardly of the head 122, and a standard spinner 130 may be pivotally mounted to the hook 128. An elongated, bifurcated strip of loop pile fabric 132 may be connected about the shank 126 and hook 128 of the lure. The rear portion of strip 132 may be bifurcated into two or more tail portions 134 and 136.

Figure 28:
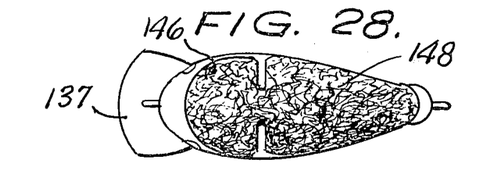
FIG. 28 is a top view of a plug type lure which embodies yet another alternative form of the present invention.
Figures 29, 31, 32, 34:
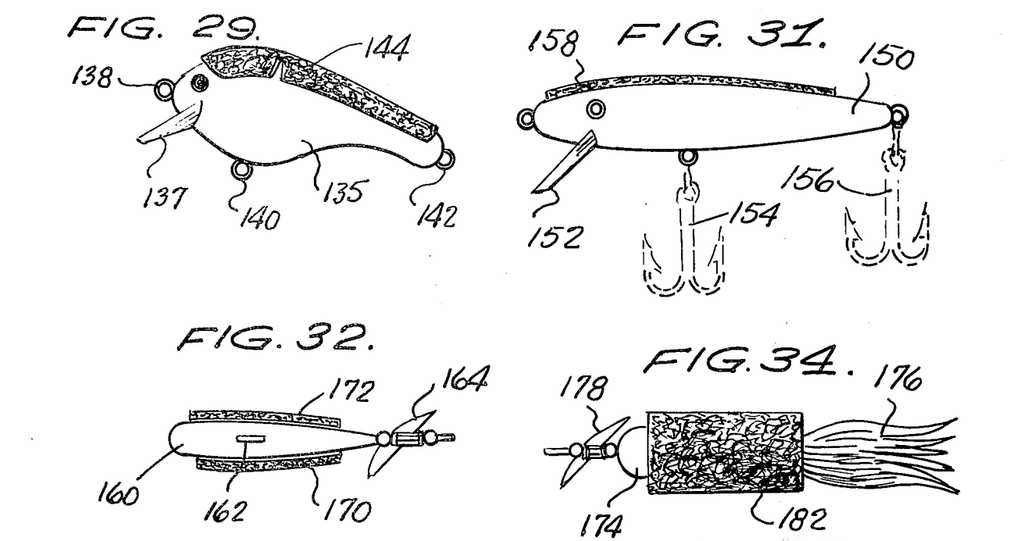
FIG. 29 is a side view of the preferred embodiment illustrated in FIG. 28.
FIG. 31 is a side view of the preferred embodiment illustrated in FIG. 30.
FIG. 32 is a top view of a lead body bait embodying an alternative form of the present invention.
FIG. 34 is a top view of yet another alternative form of the present invention.

FIGS. 28 and 29 illustrate an artificial lure 135 which is of the plug type, and is presently marketed under the trademark "BIG-O" as manufactured by Cordell Tackle, Inc. of Hot Springs, Ark. The plug body 135 includes a forwardly placed diving lip 137 and an aperture 138 for attachment to the fishing line. A pair of apertures 140 and 142 are included for attachment of conventional fish hooks, if desired. The top of the body 138 has a piece of loop pile fabric 144 secured thereto. The fabric 144, composed of a plurality of loop elements as discussed above, includes a forward portion 146 and a rear portion 148 which are divided as illustrated in FIG. 28 to enable same to fit the curved contour of the top of the lure body 135.

Figure 30:
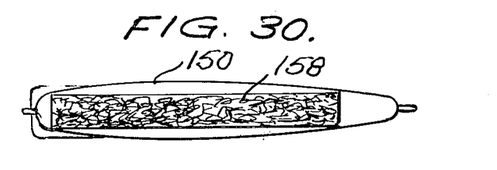
FIG. 30 is a top view of an alternative plug type lure embodying the present invention.

FIGS. 30 and 31 illustrate an alternative plug-type lure 150 which is composed of an elongated body having a forward dividing lip 152 and a pair of standard fish hooks 154 and 156 connected thereto. A top, elongated thin strip of loop type fabric 158 is mounted to the top of lure body 150.

Figure 33:
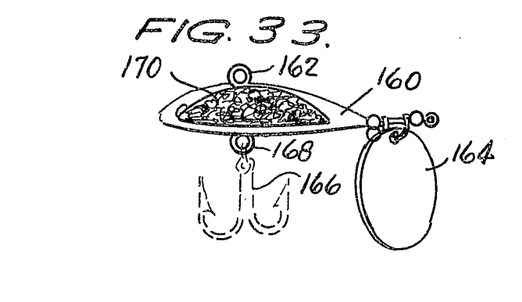
FIG. 33 is a side view of the preferred embodiment illustrated in FIG. 32.

FIGS. 32 and 33 indicate a solid lead body bait 160 having a top-positioned loop 162 for attachment to a fishing line. A spinner 164 is mounted to the rear of the bait 160, and a fish hook 166 is connected to a loop 168 formed at the bottom portion thereof. A pair of loop pile fabric sheets 170 and 172 are preferably connected to each side of the body 160 as illustrated.

Figure 35:
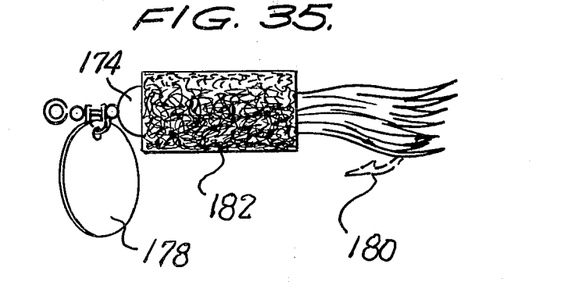
FIG. 35 is a side view of the preferred embodiment illustrated in FIG. 34.

Referring now to FIGS. 34 and 35, reference numeral 174 indicates a lead cylinder body about which is positioned a loop pile fabric sleeve 182. A plurality of individual tail members 176 may extend rearwardly from the body 174, and a spinner 178 and hook 180 may also be provided.

Figure 36:
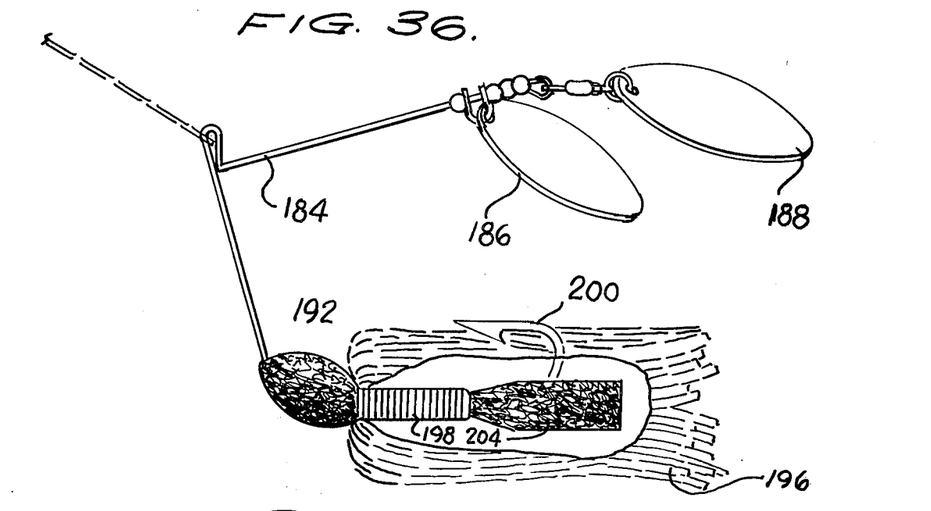
FIG. 36 is a plan view of a spinner bait assembly which embodies yet another preferred form of the present invention.
Figure 37:
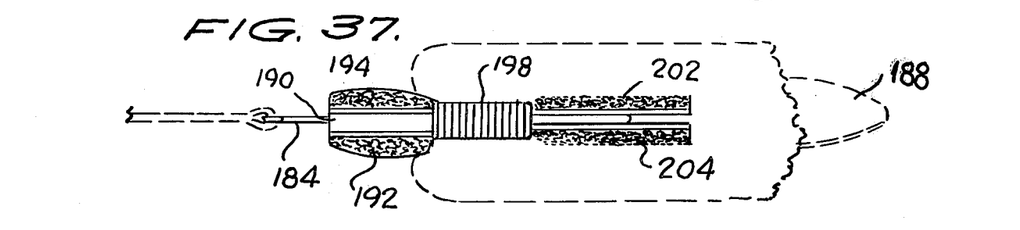
FIG. 37 is a bottom, partially cut-away view of the preferred embodiment illustrated in FIG. 36.

FIGS. 36 and 37 illustrate one form of spinner bait which may embody the principles of the present invention. The spinner bait comprises a stiff, wire frame member 184 having a pair of spinners 186 and 188 pivotally connected at one end thereof. At the other end of frame 184 is positioned a lure head 190, to each side of which are mounted a pair of loop-style Velcro fabric strips 192 and 194. The lure may include a skirt 196 of a plurality of soft rubber or plastic strands, known for their fish attracting capabilities, which may be attached to the shank of a hook 200 by means of a binding 198. Binding 198 may also serve to retain a pair of rearwardly extending loop fabric strips 202 and 204.

Figure 38:
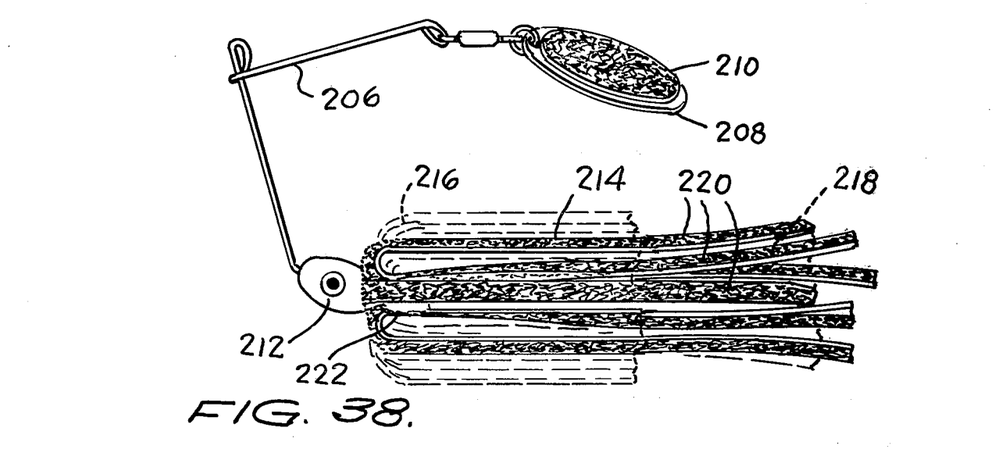
FIG. 38 is a plan view illustrating yet another alternative but preferred embodiment of the present invention.

Referring now to FIG. 38, reference numeral 206 indicates a wire frame assembly which terminates at one end thereof in a spinner blade 208. Spinner blade 208 may have attached to one or both surfaces thereof a loop fabric piece 210. The other end of frame 206 terminates in a bait head 212 from which rearwardly extends a conventional barbed hook 124. The lure illustrated in FIG. 38 includes a forwardly facing skirt 216 comprised of a plurality of plastic or rubber-like skirt members, a similar rearwardly facing skirt 218, and a plurality of individual loop fabric strips 220. The skirts 216 nd 218, as well as the Velcro loop strips 220, may be held on the shank of the hook 214 by mounting means 222, such as a rubber tube, binding means, or the like.

Figure 39:
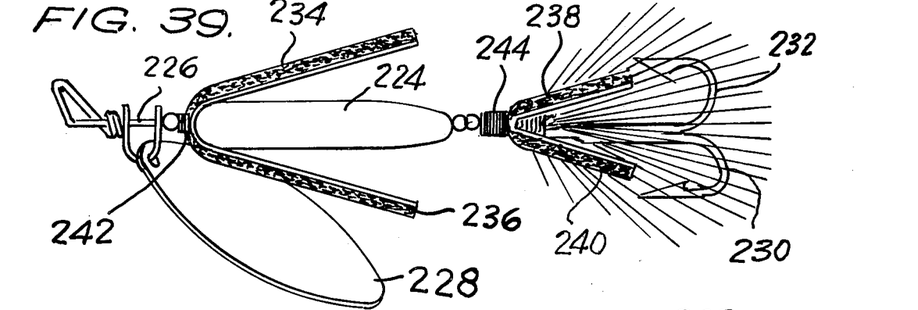
FIG. 39 is a plan view illustrating yet another alternative preferred embodiment of the present invention.
Figure 40:
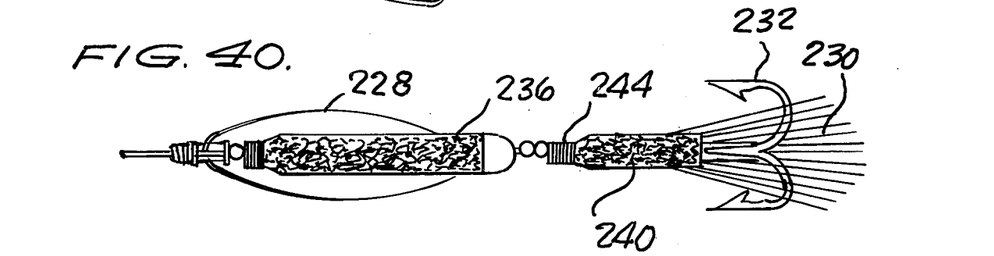
FIG. 40 is a top view of the preferred embodiment illustrated in FIG. 39.

Referring now to FIGS. 39 and 40, there is illustrated yet another alternative form of the present invention embodied by a fishing lure marketed under the trademark "COTTONTAIL" by Cordell Tackle, Inc. of Hot Springs, Ark. This lure features an elongated, thin body portion 224 having a longitudinal aperture through which extends a wire frame 226. Mounted to the forward end of frame 226 is a spinner blade 228, while the rear end terminates in a standard hook 232. Mounted between the body portion 224 and hook 232 on the frame 226 are a plurality of very fine fibers 230 in the form of a tail. A pair of loop-type Velcro strips 238 and 240 may also be mounted to the frame 226 by means of a wire or thread binder 244. Mounted forwardly of body 224 but behind the spinner blade 228 may be another pair of Velcro loop-type strips 234 and 236 held in position by binding means 242.

Figures 41, 42:
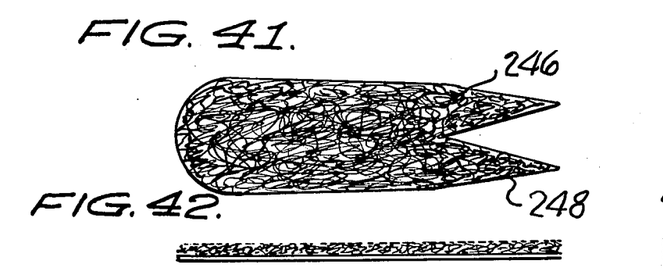
FIG. 41 is a plan view of a preferred embodiment of the present invention.
FIG. 42 is a side view in elevation of the preferred embodiment illustrated in FIG. 41.
Figure 43:
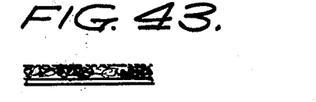
FIG. 43 is an end view of the preferred embodiment illustrated in FIGS. 41 and 42.
Figure 44:
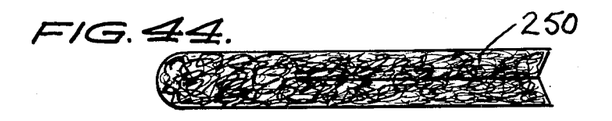
FIG. 44 is a top view of yet another alternative but preferred embodiment of the present invention.
Figure 45:
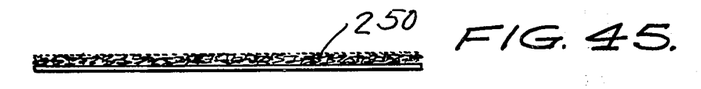
FIG. 45 is a side view of the embodiment illustrated in FIG. 44.
Figure 46:
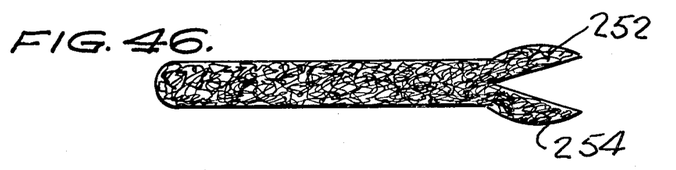
FIG. 46 is a plan view of still another alternative embodiment of the present invention.

FIGS. 41, 42 and 43 illustrate top, side and end views, respectively, of a loop pile fabric sheet which comprises a pair of tail portions 246 and 248 which form a V. FIGS. 44 and 45 illustrate yet another alternative form of the present invention which comprises loop pile fabric having a central slit 250, while FIG. 46 illustrates the same basic shape as FIGS. 44 and 45 but which terminates in a bifurcated tail 252 and 254.

The loop element Velcro strips illustrated in FIGS. 41 through 46 may be used as a fly strip, pork rind strip, prepared bait strip, or the like, either alone or in conjunction with a conventional fish hook.

Obviously, numerous modifications and variations of the present invention are possible in light of the above teachings. It is therefore to be understood that within the scope of the appended claims, the invention may be practiced otherwise than as specifically described herein.

I claim as my invention:

1. Apparatus, which comprises loop pile means for catching live fish, said loop pile means comprising loop elements, means for supporting said loop elements, and artificial lure means to which said supporting means is attached.

2. The apparatus as set forth in claim 1, wherein said artificial lure means comprises an elongated, flexible, pliable, plastic body.

3. The apparatus as set forth in claim 1, wherein said artificial lure means comprises a spinner.

4. The apparatus as set forth in claim 3, wherein said spinner includes first and second surfaces, and said supporting means is attached to at least one of said first and second surfaces.

5. The apparatus as set forth in claim 1, wherein said artificial lure means comprises a spoon.

6. The apparatus as set forth in claim 5, wherein said spoon includes first and second surfaces, and said supporting means is attached to at least one of said first and second surfaces.

7. The apparatus as set forth in claim 6, further comprising a fish hook connected to said spoon.

8. The apparatus as set forth in claim 1, wherein said artificial lure means comprises a jig.

9. The apparatus as set forth in claim 8, wherein said jig includes a fish hook connected thereto.

10. The apparatus as set forth in claim 9, wherein said jig further comprises a skirt connected thereto.

11. The apparatus as set forth in claim 1, wherein said artificial lure means comprises a plug.

12. The apparatus as set forth in claim 11, wherein said plug includes a fish hook connected thereto.

13. The apparatus as set forth in claim 1, wherein said artificial lure means comprises a solid lead body.

14. The apparatus as set forth in claim 13, wherein said body includes a spinner and a fish hook connected thereto.

15. The apparatus as set forth in claim 1, wherein said artificial lure means comprises a wire frame member having a spinner connected to one end thereof and a jig head connected to the other end thereof.

16. The apparatus as set forth in claim 15, wherein said spinner has said supporting means attached thereto.

17. The apparatus as set forth in claim 15, wherein said jig head has said supporting means attached thereto.

18. The apparatus as set forth in claim 17, further comprising a fish hook extending from said jig head.

19. The apparatus as set forth in claim 18, wherein said supporting means comprises a plurality of elongated strips, each having said loop elements formed thereon, and connected at one end thereof to said jig head.

20. The apparatus as set forth in claim 19, wherein said spinner has a piece of said supporting means attached thereto.

21. The apparatus as set forth in claim 15, wherein said jig head further includes a skirt connected thereto.

22. The apparatus as set forth in claim 1, wherein said means for supporting said loop elements comprises a piece of fabric.

23. The apparatus as set forth in claim 1, wherein said means for supporting said loop elements comprises a piece of material.

24. The apparatus as set forth in claim 1, wherein said loop elements comprise a multiplicity of upstanding loop elements extending laterally from said supporting means.

25. The apparatus as set forth in claim 1, wherein said loop pile means further comprises a multiplicity of curled strands extending from said supporting means.

26. Apparatus, which comprises means for catching live fish, said means comprising a base material and a multiplicity of small, upstanding, closely-spaced flexibly resilient loop elements each extending therefrom, and artificial lure means to which said base material is attached.

27. Apparatus, which comprises means for catching live fish, said means comprising a base material and a multiplicity of small, upstanding, closely-spaced flexibly resilient curled strands each extending therefrom, and artificial lure means to which said base material is attached.

28. Apparatus, which comprises means for catching live fish, said means comprising a base fabric and a multiplicity of small, upstanding, closely-spaced flexibly resilient loop elements each extending therefrom, and artificial lure means to which said base fabric is attached.

29. Apparatus, which comprises means for catching live fish, said means comprising a base fabric and a multiplicity of small, upstanding, closely-spaced flexibly resilient curled strands each extending therefrom, and artificial lure means to which said base fabric is attached.

30. Apparatus, which comprises loop pile means for catching live fish, said loop pile means comprising curled strands and means for supporting said curled strands, and artificial lure means to which said supporting means is attached.

31. Apparatus, which comprises means for catching live fish, said means comprising the loop element portion of a Velcro fastening device, and artificial lure means to which said loop element portion is attached.

32. Apparatus, which comprises means for catching live fish, said means comprising a base material from which extends loop pile, and artificial lure means to which said base material is attached.

33. Apparatus, which comprises means for catching live fish, said means comprising a base fabric of woven material having loops woven thereon as a pile, and artificial lure means to which said base fabric is attached.

34. The apparatus as set forth in claim 33, wherein said loops extend generally vertically from one surface of said base fabric in which they are woven.

35. The apparatus as set forth in claim 33, wherein said loops comprise a multiplicity of upstanding loop elements.

36. The apparatus as set forth in claim 33, wherein said loops comprise a multiplicity of upstanding curled strands.

37. Apparatus, which comprises loop pile means for catching live fish, wherein said loop pile means comprises the loop element portion of a Scotchmate fastening device, and artificial lure means to which said loop pile means is attached.

38. Apparatus, which comprises means for catching live fish, said means comprising the loop element portion of a Scotchmate fastening device and artificial lure means to which said loop element portion is attached.

39. Apparatus, which comprises loop pile means for catching live fish, said loop pile means comprising loop elements, curled strands and means for supporting said loop elements and said curled strands, and artificial lure means to which said supporting means is attached.

40. In combination with a fishing lure, the improvement comprising the attachment to said lure of loop pile means including fabric support means having loop elements formed thereon for engagement with the teeth of a fish.

41. A method of catching live fish which comprises the steps of providing loop pile means comprising support means having loop elements formed thereon, and engaging said fish with said loop pile means.

42. A method as set forth in claim 41, wherein said loop pile means comprises the loop element portion of a Scotchmate fastening device.

43. A method as set forth in claim 41, wherein said loop pile means comprises the loop element portion of a Velcro fastening device.

44. A method of making a fish lure which includes the steps of providing lure means for attracting live fish, and attaching thereto loop pile means for engaging said fish.

45. A method as set forth in claim 44, wherein said loop pile means includes a base material and loop elements which project laterally from said base material.

* * * * *

UNITED STATES PATENT AND TRADEMARK OFFICE
CERTIFICATE OF CORRECTION

PATENT NO. : 4,158,927
DATED : June 26, 1979
INVENTOR(S) : Theodore L. Capra; Nancy J. Capra.

It is certified that error appears in the above-identified patent and that said Letters Patent are hereby corrected as shown below:

Column 4, line 19, "materials" should read --material--.

Column 4, line 28, "2,009,235" should read --3,009,235--.

Column 7, line 11, "nd" should read --and--.

Signed and Sealed this

Ninth Day of October 1979

[SEAL]

Attest:

RUTH C. MASON
Attesting Officer

LUTRELLE F. PARKER
Acting Commissioner of Patents and Trademarks